United States Patent
Lee et al.

(10) Patent No.: US 9,791,966 B2
(45) Date of Patent: Oct. 17, 2017

(54) LIQUID CRYSTAL DISPLAY DEVICE WITH GATE CLOCK SIGNALS HAVING SPECIFIC SLEW RATE

(71) Applicant: LG DISPLAY CO., LTD., Seoul (KR)

(72) Inventors: Taeho Lee, Paju-si (KR); YoungHyoung Seo, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 23 days.

(21) Appl. No.: 14/974,995

(22) Filed: Dec. 18, 2015

(65) Prior Publication Data

US 2016/0179275 A1  Jun. 23, 2016

(30) Foreign Application Priority Data

Dec. 22, 2014  (KR) .................. 10-2014-0186161

(51) Int. Cl.
*G09G 3/36* (2006.01)
*G06F 3/041* (2006.01)
*G06F 3/044* (2006.01)

(52) U.S. Cl.
CPC ............ *G06F 3/0416* (2013.01); *G06F 3/044* (2013.01); *G09G 3/3677* (2013.01); *G09G 2320/0219* (2013.01); *G09G 2354/00* (2013.01)

(58) Field of Classification Search
CPC ....... G09G 2310/08; G09G 2310/0286; G09G 2310/3688
USPC ................................... 345/100, 173–174, 99
See application file for complete search history.

(56) References Cited

U.S. PATENT DOCUMENTS

| | | | | |
|---|---|---|---|---|
| 2007/0091054 A1* | 4/2007 | Lee | ...................... | G09G 3/3688 345/100 |
| 2010/0171716 A1* | 7/2010 | Ikeda | .................. | G06F 3/04883 345/173 |
| 2012/0162121 A1* | 6/2012 | Chang | ................... | G06F 3/0416 345/174 |
| 2012/0280965 A1* | 11/2012 | Lee | ...................... | G09G 3/3677 345/212 |
| 2013/0328755 A1 | 12/2013 | Al-Dahle et al. | | |
| 2014/0375703 A1* | 12/2014 | Ban | ...................... | G09G 3/3688 345/691 |
| 2015/0084899 A1* | 3/2015 | Park | .................... | G06F 3/03545 345/173 |

FOREIGN PATENT DOCUMENTS

WO   WO 2012/147962 A1   11/2012

* cited by examiner

*Primary Examiner* — Roy Rabindranath
(74) *Attorney, Agent, or Firm* — Birch, Stewart, Kolasch & Birch, LLP

(57) ABSTRACT

A liquid crystal display device is provided in which gate pulses are generated high-voltage using at least two gate clocks having a specific slew rate. The liquid crystal display device can include a liquid crystal display panel including gate and date lines as well as first and second touch electrodes; a touch sensing unit to supply a common voltage to the first and second touch electrodes during an image display period, and to sense a touch contact or operation during a touch sensing period; a controller to generate at least two gate clocks having a specific slew rate; a gate driver to generate gate pulses with the gate clocks, and to sequentially output the gate pulses to the gate lines during the image display period; and a data driver to supply data voltages to the data lines in response to a data control signal during the image display period.

13 Claims, 6 Drawing Sheets

LIQUID CRYSTAL DISPLAY DEVICE WITH GATE CLOCK SIGNALS HAVING SPECIFIC SLEW RATE

CROSS-REFERENCE TO RELATED APPLICATIONS

This application claims the priority benefit of the Korean Patent Application No. 10-2014-0186161 filed on Dec. 22, 2014, which is hereby incorporated by reference as if fully set forth herein.

BACKGROUND OF THE INVENTION

Field of Technology

The present disclosure relates to a liquid crystal display device, and more particularly, to a liquid crystal display panel having a touch panel and a liquid crystal display device using the liquid crystal display panel.

Discussion of the Related Art

A touch panel is mounted on a display device such as a liquid crystal display device (LCD), a plasma display panel (PDP), an organic light emitting display device (OLED), or an electrophoretic display (EPD).

A method of manufacturing a liquid crystal display device having a touch panel is classified into two types: an add-on type in which a display panel and a touch panel configured to sense touch contacts or operations are separately manufactured and then bonded together, and an in-cell type in which a touch panel is built into or integrated with a display panel.

Figure 1:
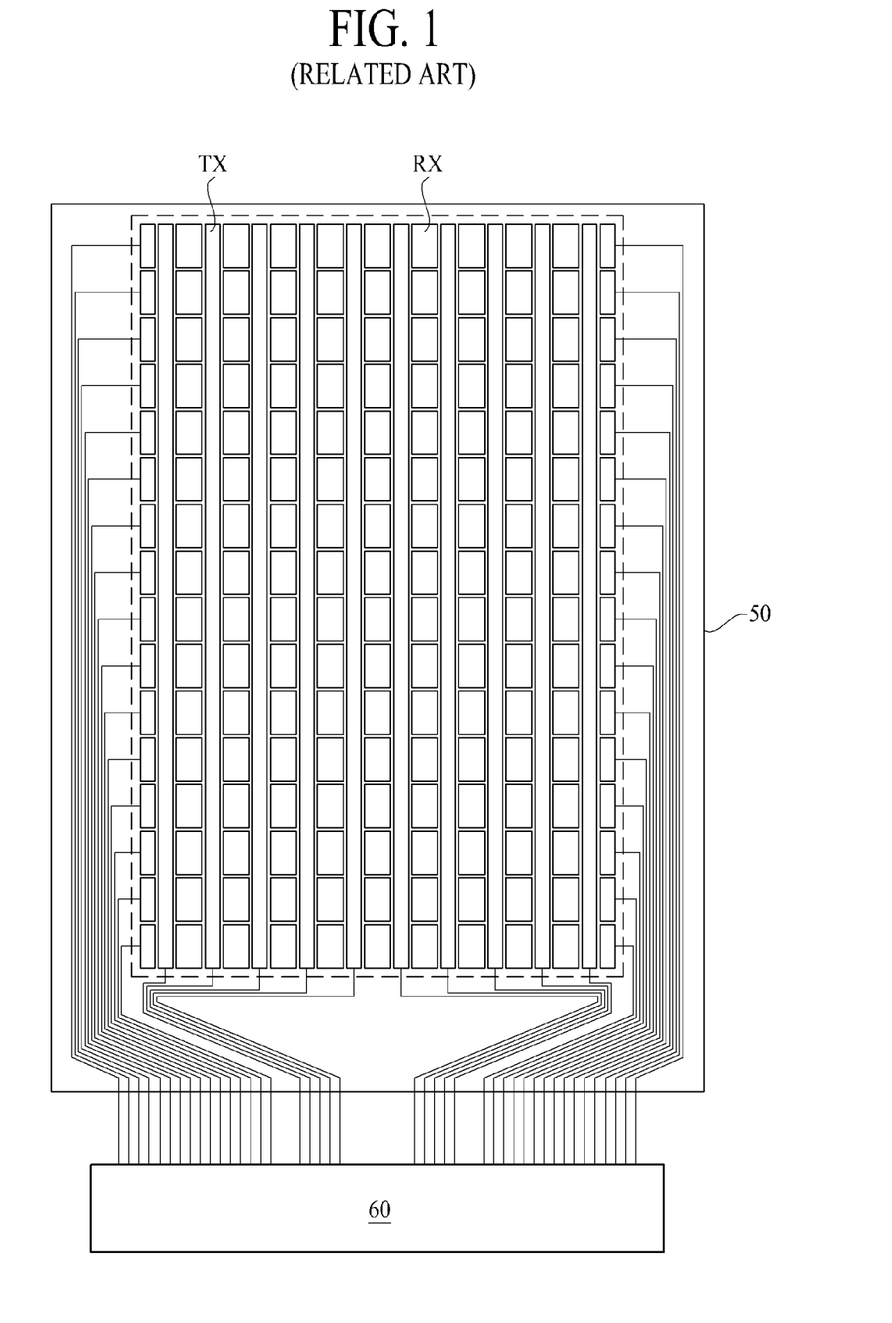
FIG. 1 is a diagram schematically illustrating a liquid crystal display device according to the related art having an in-cell type touch panel.
Figure 2:
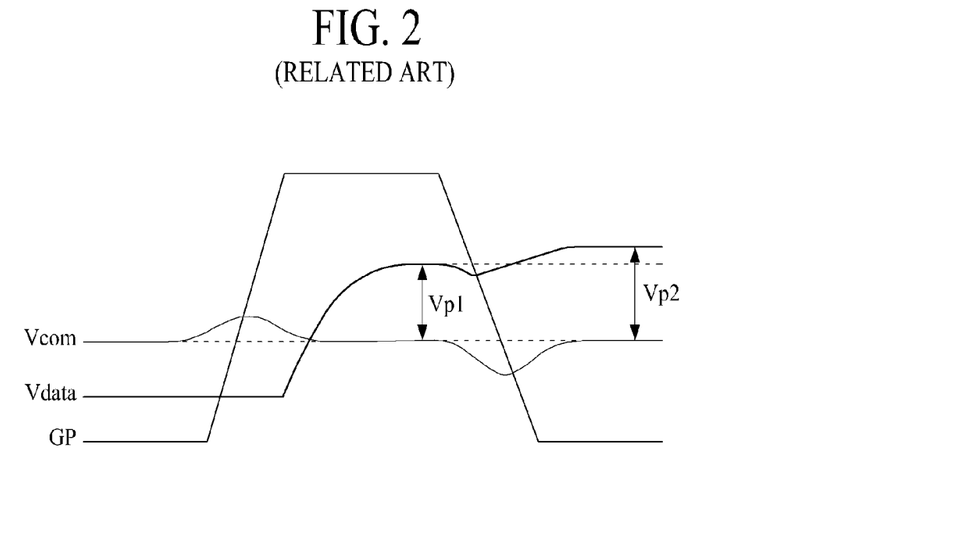
FIG. 2 is a diagram illustrating waveforms of signals which are applied to the liquid crystal display device according to the related art having an in-cell type touch panel.

FIG. 1 is a diagram schematically illustrating a liquid crystal display device according to the related art having an in-cell type touch panel, and FIG. 2 is a diagram illustrating waveforms of signals which are applied to the liquid crystal display device according to the related art having an in-cell type touch panel.

Referring to FIG. 1, the liquid crystal display device according to the related art having an in-cell type touch panel includes a liquid crystal display panel 50 in which touch electrodes, which are also used as common electrodes, are formed. A touch sensing unit 60 drives the touch electrodes, which include driving electrodes TX and receiving electrodes RX. Each of the driving electrodes TX is formed in a line shape and each of the receiving electrodes RX is formed in a line shape or island type jumping line shape. In this case, gate lines are formed in the liquid crystal display device 50 so as to overlap the receiving electrodes RX formed in a horizontal (row) direction of the liquid crystal display device 50.

A common voltage is supplied to the driving electrodes TX and the receiving electrodes RX during an image display period which an image is displayed. Touch drive signals are sequentially supplied to the driving electrodes TX during a touch sensing period in which a touch contact or operation is sensed, and the receiving electrodes RX transmit sensing signals to the touch sensing unit 60.

When the supplied voltages are non-uniform through the driving electrodes and the receiving electrodes, an uneven brightness pattern such as striped patterns having a line shape will be displayed on the screen along the driving electrodes and the receiving electrodes. The striped patterns may be observed by the viewer as dimmed stripes or brightened stripes depend on the voltage deviation.

For example, in the display device illustrated in FIG. 1, the receiving electrodes RX are formed to be parallel to and overlap with the gate lines.

When gate pulses are supplied to the gate lines during the image display period, parasitic capacitance may be generated between the gate lines and the driving electrodes TX and also between the gate lines and the receiving electrodes RX.

As such, a voltage level difference between the common voltage supplied to the driving electrodes TX and the common voltage supplied to the receiving electrodes RX may occur, and a potential difference between pixel voltages charged at pixel electrodes and common voltage charged at common electrode formed on the panel 50 may occur due to the common voltage deviation. Accordingly, vertical striped patterns may appear on the display screen along the driving electrodes TX.

The above-mentioned striped patterns may appear on the screen along the receiving electrodes RX in the horizontal (row) direction.

However, in general, the striped patterns appearing along the driving electrodes TX are more visible due to their arrangement being perpendicular to the gate lines, as opposed to the striped patterns appearing along the receiving electrodes RX which are arranged to be parallel to the gate lines.

As such, if the driving electrodes TX are arranged along the gate lines in the horizontal (row) direction of the liquid crystal display panel 50 and the receiving electrodes RX are arranged to be perpendicular to the gate lines in the vertical (column) direction of the liquid crystal display panel 50, undesirable patterns appearing on the screen in the vertical direction along the receiving electrodes RX may be more conspicuous.

The reason why the striped patterns appear on the liquid crystal display device having an in-cell type touch panel according to the related art will be described below in more detail with reference to FIG. 2.

When a gate pulse GP is supplied to a gate line during the image display period, a data voltage Vdata is supplied to pixels which are corresponding to the gate line and a common voltage Vcom is supplied to the driving electrode TX and the receiving electrode RX. A pixel voltage corresponding to the difference between the data voltage Vdata and the common voltage Vcom is applied to a liquid crystal to control the light transmittance thereof.

When the gate pulse GP falls, the data voltage Vdata and the common voltage Vcom initially fall and then rise again due to a coupling effect. The magnitude of the data voltage Vdata from falling to rising is different from the magnitude of the common voltage Vcom from falling to rising. Accordingly, a pixel voltage Vp1 of an interval in which the gate pulse is in a high state is different from a pixel voltage Vp2 of an interval in which the gate pulse is in a low state.

Referring to FIG. 1, the pixel voltage difference Vp2−Vp1 between the pixels corresponding to the driving electrode TX which is formed to be perpendicular to the gate line is different from the pixel voltage difference Vp2−Vp1 between the pixels corresponding to the receiving electrode RX which is formed to be parallel to the gate line.

A difference in luminance between the pixels corresponding to the driving electrode TX and pixels corresponding to the receiving electrode RX occurs due to the above-mentioned difference, and striped patterns appear in the horizontal (row) or the vertical (column) direction on the liquid crystal display panel 50.

Particularly, since the pixel voltage difference Vp2−Vp1 between the pixels corresponding to the driving electrode TX which is formed to be perpendicular to the gate line is greater than the pixel voltage difference Vp2−Vp1 between the pixels corresponding to the receiving electrode RX which is formed to be parallel to the gate line, the striped pattern appearing on the display screen in the vertical direction perpendicular to the gate line is more conspicuous.

SUMMARY OF THE INVENTION

The present disclosure addresses the above-mentioned problems and other limitations associated with the related art. The present disclosure pertains to a liquid crystal display device in which a gate pulse is generated using at least two gate clocks having a specific slew rate.

According to an aspect of the present disclosure, there is provided a liquid crystal display device including: a liquid crystal display panel that includes gate lines, data lines, first touch electrodes which are parallel to the gate lines, and second touch electrodes which are perpendicular to the gate lines; a touch sensing unit that supplies a common voltage to the first touch electrodes and the second touch electrodes during an image display period and that senses a touch using the first touch electrodes and the second touch electrodes in a touch sensing period; a controller that generates at least two gate clocks having a specific slew rate; a gate driver that generates gate pulses using the gate clocks and sequentially outputs the gate pulses to the gate lines during the image display period; and a data driver that supplies data voltages to the data lines in response to a data control signal transmitted from the controller during the image display period.

According to the aspect of the present disclosure, striped patterns do not appear on the display screen along the touch electrodes that are formed to be perpendicular to the gate lines.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Hereinafter, embodiments of the present disclosure will be described in detail with reference to the accompanying drawings.

Figure 3:
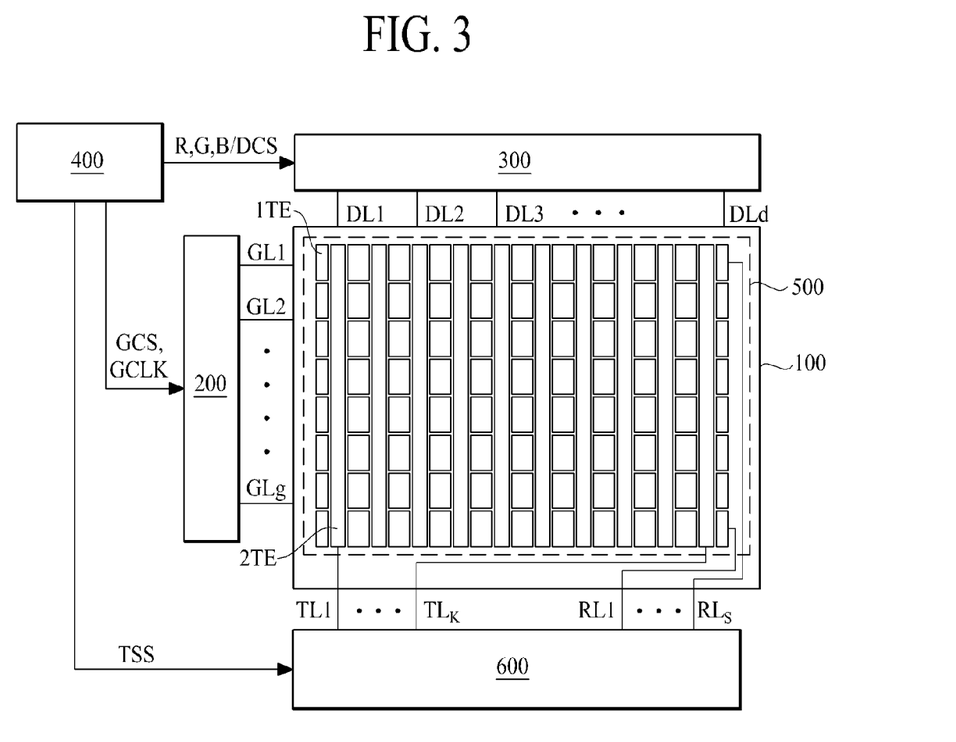
FIG. 3 is a diagram schematically illustrating a configuration of a display device according to an embodiment of the present invention.

FIG. 3 is a diagram schematically illustrating a configuration of a display device according to an embodiment of the present disclosure. All the components of the display device according to all the embodiments of the present disclosure are operatively coupled and configured.

The display device according to an embodiment of the present disclosure includes a liquid crystal display panel 100 that includes gate lines GL1 to GLg, data lines DL1 to DLd, first touch electrodes 1TE parallel to the gate lines, and second touch electrodes 2TE perpendicular to the gate lines, a touch sensing unit 600 that supplies a common voltage to the first touch electrodes 1TE and the second touch electrodes 2TE during an image display period and determines whether a touch contact or operation occurs or not during a touch sensing period using the first touch electrodes 1TE and the second touch electrodes 2TE, a controller 400 that generates at least two gate clock signals GCLK having a specific slew rate, a gate driver 200 that generates gate pulses using the gate clock signal(s) GCLK during the image display period and sequentially outputs the gate pulses to the gate lines, a data driver 300 that supplies data voltages to the data lines according to a data control signal DCS transmitted from the controller 400 during the image display period. The first touch electrode and the second touch electrode are collectively referred as a touch panel 500.

First, the liquid crystal display device 100 is formed by bonding a first substrate with a second substrate. An interlayer is formed between the first substrate and the second substrate.

The first substrate and the second substrate can be made of glass, plastic, metal, or the like. The interlayer includes liquid crystal.

On the first substrate, the data lines DL1 to DLd, the gate lines GL1 to GLg, Thin Film Transistors (TFT) for the pixels on the liquid crystal display panel, pixel electrodes that are formed in the pixels and charge the pixels with the data voltage, and common electrodes that drive the pixel electrodes and liquid crystal charged in the pixels are formed.

The pixels are arranged in a matrix form with respect to the data lines DL1 to DLd and the gate lines GL1 to GLg that cross each other, and the TFT, the pixel electrode, and the common electrode are formed in each of the pixels.

A gate pulse is supplied to each of the gate lines from the gate driver 200. A data voltage is supplied to each of the data lines from the data driver 300.

On the first substrate, first touch electrodes 1TE parallel to the gate lines GL1 to GLg and second touch electrodes 2TE perpendicular to the gate lines GL1 to GLg are arranged. Each of the first touch electrodes and the second touch electrodes serves as a common electrode and as a touch sensing structure.

A common voltage is supplied to the first touch electrodes 1TE and the second touch electrodes 2TE during an image display period. A touch drive signal is sequentially supplied to the first touch electrodes 1TE or the second touch electrodes 2TE. The first touch electrodes 1TE or the second touch electrodes 2TE transmit the sensed signal to the touch sensing unit 600.

The first touch electrodes and the second touch electrodes are electrically connected to the touch sensing unit 600 via touch electrode lines TL1 to TLk and RL1 to RLs.

Second, the controller 400 receives a timing signal, such as a data enable signal DE, a dot clock signal, etc. from an outer system, and generates control signals GCS and DCS for controlling operation timing of the data driver 300 and the gate driver 200. Furthermore, the controller 400 re-arranges an input image data supplied from the outer system, and outputs the re-arranged image data R, G, and B to the data driver 300. The controller 400 can also generate a touch synchronous signal TSS for controlling the operation timing of the touch sensing unit 600 in order to control the touch sensing unit 600.

For example, when the touch panel 500 is built in the liquid crystal display panel 100, the controller 400 can generate and transmit a touch synchronous signal (TCS) to the touch sensing unit 600 so as to repeat an image output period during which an image is output and a touch sensing period during which a touch contact or operation is sensed.

Particularly, the controller 400 generates at least two gate clock signals having a specific slew rate and transmits the generated clock signals to the gate driver 200.

Third, the data driver 300 converts the image data supplied from the timing controller 400 into a data voltage, and supplies the data voltage corresponding to one horizontal line to the data line, every one horizontal period during which a gate pulse is supplied to the gate line.

For example, the data driver 300 converts the image data into corresponding data voltages using a gamma voltage supplied from a gamma voltage generating unit, and outputs the data voltages to the data lines.

Fourth, the gate driver 200 shifts a gate start pulse that is transmitted from the timing controller 400 according to a gate shift clock signal, and sequentially supplies the gate pulse to the gate lines GL1 to GLg.

Particularly, the gate driver 200 generates the gate pulse using the gate clock signals transmitted from the controller 400.

The data driver 300, the gate driver 200, and the controller 400 are described to be separately configured, but at least one of the data driver 300 and the gate driver 200 may be included in the controller 400.

Fifth, the touch sensing unit 600 carries out a function of sensing a touch contact or operation on the touch panel 500 using the sensed signals transmitted from the touch panel 500.

The touch panel 500 including the first touch electrode and the second touch electrode supports capacitance based touch operations and is formed in the liquid crystal display panel 100.

Particularly, the touch panel 500 is configured in a mutual type. Such mutual type touch panel 500 includes driving electrodes that are supplied with touch drive signals, and receiving electrodes that transmit sensed signals generated by the touch drive signals to the touch sensing unit 600.

When the first touch electrode 1TE serves as the driving electrode, the second touch electrode 2TE serves as the receiving electrode. But, when the first touch electrode 1TE serves as the receiving electrode, the second touch electrode 2TE serves as the driving electrode.

The first touch electrode and the second touch electrode are electrically connected to the touch sensing unit 600 via touch electrode lines TK1 to TLk and RL1 to RLs.

The first touch electrode and the second touch electrode carry out a function of the common electrode during the image display period, and a function of the touch panel during the touch sensing period.

Accordingly, the touch sensing unit 600 supplies a common voltage to the first touch electrodes and the second touch electrodes during the image display period, sequentially supplies touch drive signals to the first touch electrodes or the second touch electrodes, receives the sensed signal from the first touch electrodes or the second touch electrodes, and determines whether a touch contact or operation has occurred or not.

The configuration and the function of the touch sensing unit 600 can be applied to a touch sensing unit of an in-cell type liquid crystal display device with substantially the same configuration and the functions of the touch sensing unit 600. Accordingly, the detailed description of the configuration and the function of the touch sensing unit 600 will not be repeated to avoid redundancy.

Referring to FIG. 3, the touch sensing unit 600 may be configured independently of the controller 400 and the data driver 300, or may be included in (integrated into) the controller 400 or the data driver 300.

Figure 4:
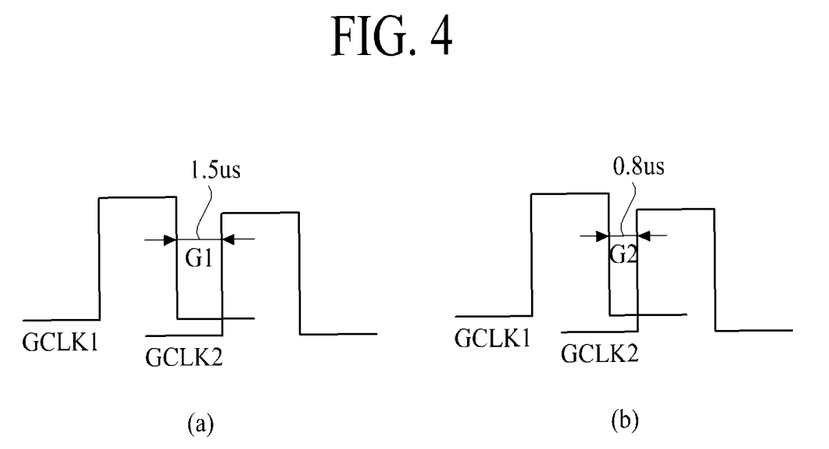
FIG. 4 including (a) and (b) shows diagrams schematically illustrating a gap between gate clocks applied to a liquid crystal display device according to an embodiment of the present invention.
Figure 5:
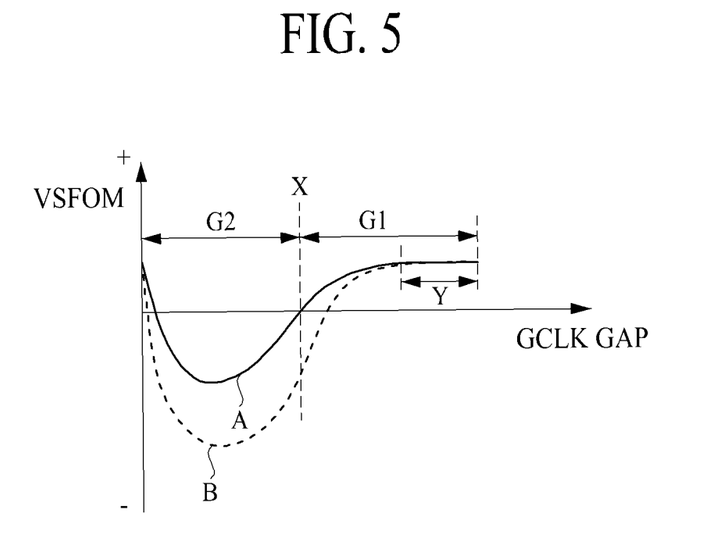
FIG. 5 is a graph illustrating an example of a luminance difference between the gate clocks due to gaps between the gate clocks applied to the liquid crystal display device according to an embodiment of the present invention.

FIG. 4 including (a) and (b) shows diagrams schematically illustrating a gap between gate clock signals (i.e. gate clocks) applied to a liquid crystal display device according to an embodiment of the present disclosure. Here, such gap can be defined as the time difference between a falling edge of a particular gate pulse in a first gate clock signal (GCLK1) to a rising edge of a corresponding gate pulse in a second gate clock signal (GCLK2), as shown in FIG. 4. Particularly, (a) in FIG. 4 illustrates a case where the gap G1 between gate clocks is relatively wide, and (b) in FIG. 4 illustrates a case where the gap G2 between gate clocks is relatively narrow. FIG. 5 is a graph illustrating an example of a luminance difference between the gate clocks due to gaps between the gate clocks applied to the liquid crystal display device according to an embodiment of the present disclosure. For example, FIG. 5 is a graph illustrating a luminance difference VSFOM (Vertical Stripe Figure Of Merit) between the vertical line and the horizontal line in the liquid crystal display panel using a value from images captured by an image capture device (such as a radiant camera) while controlling the gap of gate clocks GCLK GAP.

As described with respect to the related art, the difference in luminance occurs between pixels corresponding to touch electrodes formed in the vertical (column) direction of the liquid crystal display device and pixels corresponding to touch electrodes formed in the horizontal (row) direction of the liquid crystal display device, and striped patterns appear on the display screen along the horizontal direction and the vertical direction of the panel 50 due to the luminance difference.

The inventors of the present disclosure found out that it is possible to control a luminance difference between the vertical line and the horizontal line in the liquid crystal display panel 100 by adjusting the gap between the gate clocks transmitted from the controller 400 to the gate driver 200.

For example, referring to (a) in FIG. 4, when the gap G1 between the gate clocks GCLK 1 and GCLK 2 is wide to be about 1.5 μs, a luminance of the vertical line is greater than a luminance of the horizontal line. In this case, the gap G1 is included in gaps between gate clocks having a positive vertical axis value VSFOM of the graph illustrated in FIG. 5.

Referring to (b) in FIG. 4, when the gap G2 between the gate clocks GCLK 1 and GCLK 2 is narrow to be about 0.8 μs, the luminance of the vertical line is smaller than the luminance of the horizontal line. In this case, the gap G2 is included in the gaps between the gate clocks having a negative vertical axis value VSFOM of the graph illustrated in FIG. 5.

In this case, when the gap between the gate clocks transmitted to the gate driver 200 is controlled to be a gap X which has a zero vertical axis value VSFOM such that a difference between the luminance of the vertical line and the luminance of the horizontal line is zero. In this case, the above-mentioned luminance difference may not occur or such is minimized.

However, in a liquid crystal display panel in which the gap between the gate clocks transmitted to the gate driver 200 is controlled to be a gap X between the gate clocks at a point at which a difference between the luminance of the vertical line and the luminance of the horizontal line is zero, the above-mentioned luminance difference may occur due to continuous use (e.g., aging or hysteresis) of the liquid crystal display panel.

For example, the graph denoted as A of FIG. 5 represents a luminance difference analyzed in a process of manufacturing the liquid crystal display device, and the graph denoted as B represents a luminance difference analyzed after the liquid crystal display device was used for a lengthy period of time (e.g., over 500 hours). In addition, even when the gap of the gate clocks transmitted to the gate driver 200 is controlled to be a gap X between the gate clocks at a point X at which the luminance difference is zero in the graph denoted by A, the luminance difference at the X point is changed due to continuous use of the liquid crystal display panel. Accordingly, when the liquid crystal display panel is continuously used, the luminance of the vertical line decreases to be smaller than the luminance of the horizontal line, and thus the horizontal line becomes more conspicuous on the display screen.

Figure 6:
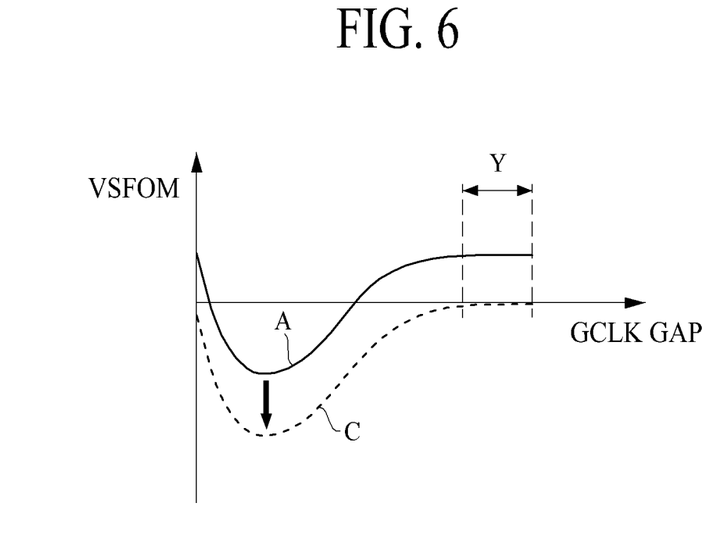
FIG. 6 is a diagram schematically illustrating another example of the gaps between the gate clocks applied to the liquid crystal display device according to an embodiment of the present invention.
Figure 7:
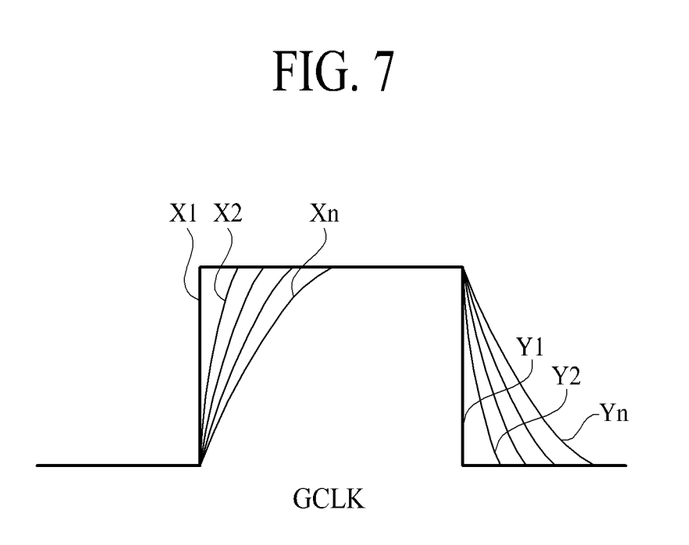
FIG. 7 is a diagram schematically explaining a slew rate of the gate clock applied to the liquid crystal display device according to an embodiment of the present invention.

FIG. 6 is a diagram schematically illustrating another example of the gaps between the gate clocks applied to the liquid crystal display device according to the present disclosure. FIG. 7 is a diagram schematically explaining a slew rate of the gate clock applied to the liquid crystal display device according to the present disclosure.

In a range Y where the gap between gate clocks is wide, referring to FIG. 5, a luminance difference of the graph denoted as A is similar to a luminance difference of the graph denoted as B.

In one example, this means that when the gap between gate clocks is relatively wide, a luminance difference between a vertical line and a horizontal line is relatively small despite the use of a liquid crystal display panel supplied with the gate clocks for a long time. In other words, by adjusting the GCLK gap to be at a Y range, the operational time factor can be ignored.

Accordingly, if the graph denoted as A as analysis results in the process of manufacturing a liquid crystal display panel can be changed to the graph denoted as C in FIG. 6, a luminance difference between a vertical line and a horizontal line does not occur despite the use of a liquid crystal display panel using gate clocks that have a gap included in the range Y for a long time.

According to various simulations and experimental results, referring to FIG. 7, the graph denoted as A was found to be changed into the graph denoted as C in FIG. 6 by adjusting a slew rate of the gate clock GCLK.

For example, in FIG. 7, when the slew rate of a gate clock is zero, the gate clock GCLK has a waveform denoted by X1 and Y1. When the slew rate of a gate clock slightly increases, the gate clock GCLK has a waveform denoted by X2 and Y2. When the slew rate of the gate clock increases even further, the gate clock GCLK has a waveform denoted by Xn and Yn.

When the gap between the gate clocks GCLK GAP is maximally widened and a slew rate of the gate clocks is changed, a luminance difference between a vertical line and a horizontal line does not occur despite the prolonged use of a liquid crystal display panel.

For this purpose, through an inspection process in the manufacturing process for a liquid crystal display panel, a slew rate and a gap between the gate clocks can be tuned (or controlled) to generate a graph denoted as C with the gap GCLK GAP being within a Y range, as illustrated in FIG. 6.

First, when a fabrication of a liquid crystal display panel is completed, gate clocks having various gaps are supplied to the liquid crystal display panel using the appropriate inspection equipment. Thereafter, a desired gap between gate clocks that is included in the range Y of FIG. 6 can be calculated using the inspection equipment.

Second, gate clocks having various slew rates are supplied to the liquid crystal display panel via the inspection equipment. A slew rate corresponding to the graph denoted as C in FIG. 6 can be calculated by the inspection equipment. In the graph denoted as C, the luminance difference between the vertical line and the horizontal line in the range Y is almost 0.

Figure 8:
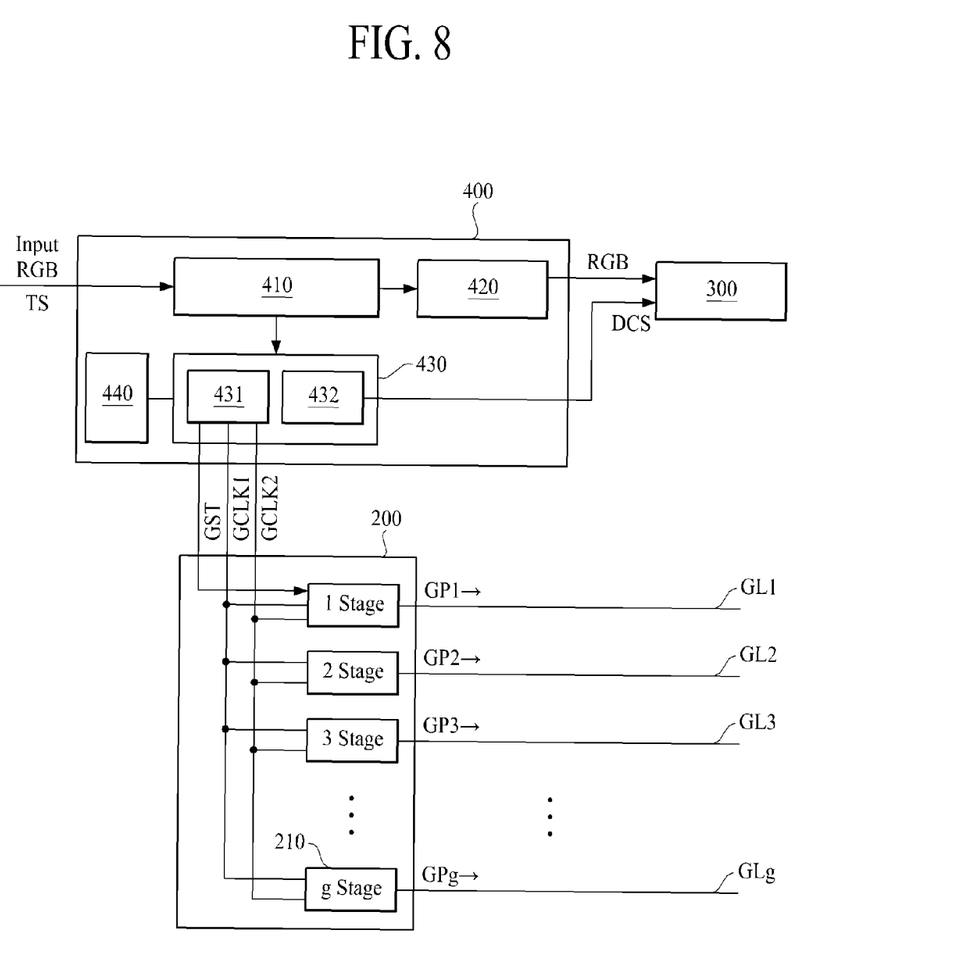
FIG. 8 is a diagram schematically illustrating configurations of a controller and a gate drive mounted in the liquid crystal display device according to another embodiment of the present invention.
Figure 9:
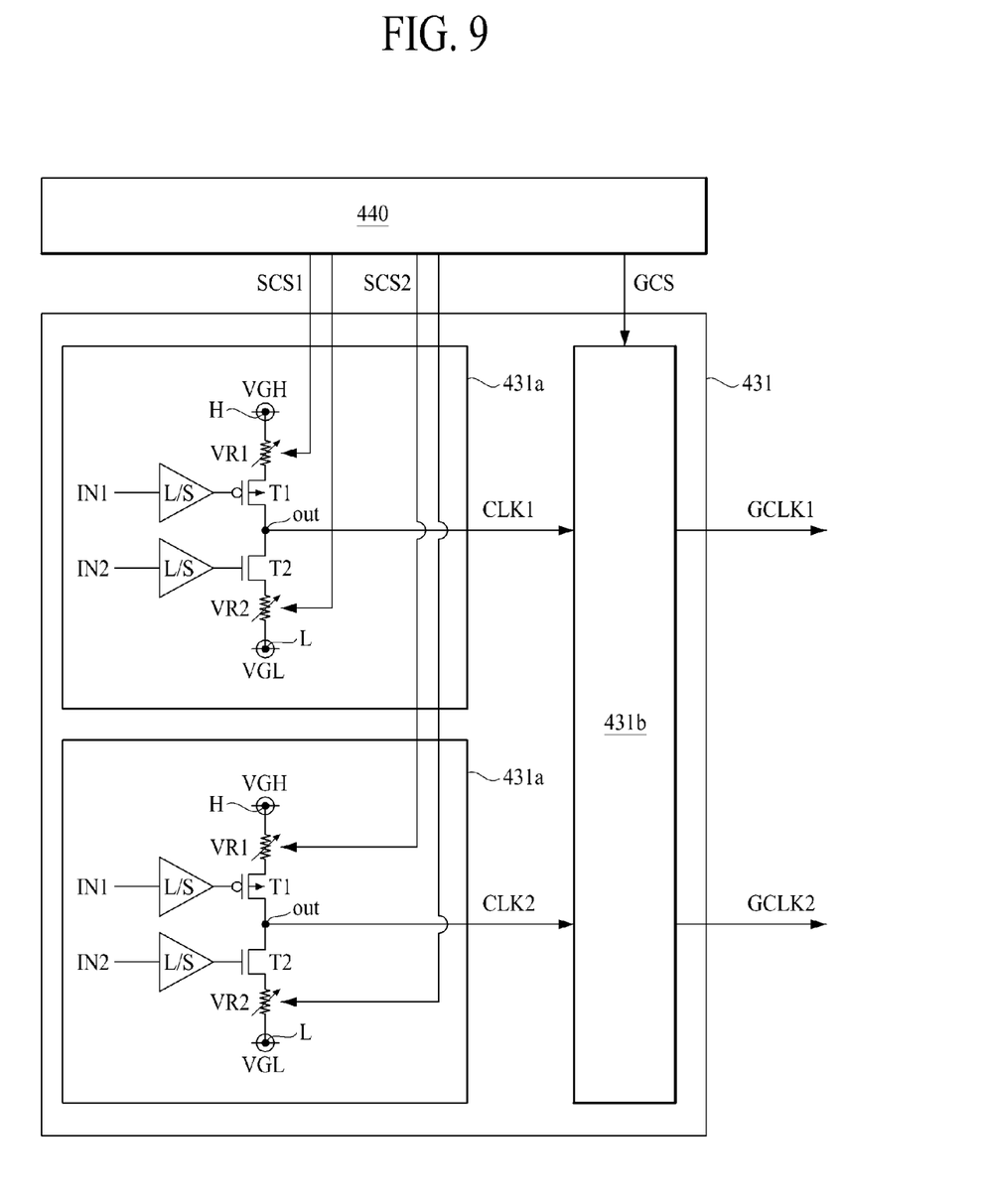
FIG. 9 is a diagram schematically illustrating a configuration of the controller illustrated in FIG. 8 in detail.

FIG. 8 is a diagram schematically illustrating configurations of a controller and a gate driver for the liquid crystal display device according to another embodiment of the present disclosure and FIG. 9 is a diagram schematically illustrating an exemplary configuration of the controller illustrated in FIG. 8 in more detail.

The controller 400 which is implemented in the liquid crystal display device according to another embodiment of the present disclosure generates at least two gate clocks having a specific or a predetermined slew rate. Hereinafter, referring to FIGS. 8 and 9, a liquid crystal display device including a controller 400 that generates two gate clocks GCLK 1 and GCLK 2 and a gate driver 200 that generates a gate pulse using the two gate clocks will be described as an example.

The controller 400 includes an input unit 410 that is supplied with an input image data (Input RGB) and the timing signal TS from an outer system, a control signal generating unit 430 that generates various control signals using the timing signal TS, an input image converting unit 420 that converts the input image data into the image data RGB and transmits the image data to the data driver 300, and a storage unit 440 that stores at least two slew rate control signals SCS1 and SCS2 for deciding the specific slew rate.

The control signal generating unit 430 includes a data control signal generating unit 432 that generates the data control signal DCS, and a gate clock generating unit 431 that generates the gate clocks GCLK 1 and GCLK 2 by changing the resistance of at least two variable resistors VR1 and VR2 using the slew rate control signals SCS. The gate clock generating unit 431 generates the gate control signal GCS. However, the control signal generating unit 430 may include a separately provided gate control signal generating unit that generates the gate control signal GCS.

First, the gate clocks GCLK have a specific gap. For example, the gap between the gate clocks GCLK 1 and GCLK2, in a graph representing a difference of brightness between the second touch electrode area and the first touch electrode area versus a gap between the gate clocks GCLK1 and GCLK2, is any one of the gaps between the gate clocks included in a range in which the second touch electrode area is brighter than the first touch electrode area.

More precisely, the gap of the gate clocks GCLK1 and GCLK2 is within the range Y in FIG. 6. As described above, the gap can be calculated in a process of manufacturing a liquid crystal display panel using a variety of inspection equipment.

Second, the gate clock generating unit 431 can include at least two generators 431a that generate clocks CLK1 and CLK2 by changing the resistance of at least two variable resistors VR1 and VR2 using the slew rate control signals SCS1 and SCS2, and a delaying unit 431b that generates the gate clocks GCLK1 and GCLK2 having a specific gap by delaying the clocks CLK1 and CLK2 using a gap control signal obtained from the storage unit 440.

The two slew rate control signals SCS1 and SCS2 are stored in the storage unit 440. As described above, the slew rate control signals can be calculated in a process of manufacturing a liquid crystal display panel using a variety of inspection equipment. More precisely, the slew rate control signals pertain to values used for generating gate clocks corresponding to the graph denoted as C in FIG. 6. For example, the first slew rate control signal SCS1 is a signal for changing a resistance of the first variable resistor VR1 of the generator 431a illustrated in FIG. 9 into a specific value, and the second slew rate control signal SCS2 is a signal for changing a resistance of the second variable resistor VR2 of the generator 431a into a specific value.

Next, each of the generators 431a changes the resistance values of at least two variable resistors VR1 and VR2 to generate clock signals using the slew rate control signals SCS1 and SCS2. For example, any one among the two generators 431a illustrated in FIG. 9 generates the first clock CLK1 and the other of the generators 431a generates the second clock CLK2.

Each of the first clock CLK1 and the second clock CLK2 has the specific slew rate.

Finally, the delaying unit 431b delays the clocks CLK1 and CLK2 using the gap control signal to generate the gate clocks GCLK1 and GCLK2 having the specific gap.

Accordingly, each of the two gate clocks GCLK1 and GCLK2 has the specific slew rate and has the specific gap.

As the delaying unit 431b, any type of delaying device that is commonly used to delay a signal in various circuits can be employed.

Third, each of the generators 431a, referring to FIG. 9, may include a first transistor T1 that is connected between a high-voltage terminal H supplied with a gate high voltage VGH and an output terminal OUT outputting the clock CLK and that is turned-on by first voltage, a second transistor T2 that is connected between a low-voltage terminal L supplied with a gate low voltage VGL and the output terminal OUT and that is turned-on by second voltage, first variable resistor VR1 that is connected between the high-voltage terminal H and the first transistor T1 and has a resistance varied according to the first slew rate control signal SCS1 obtained from the storage unit 440, and a second variable resistor VR2 that is connected between the low-voltage terminal L and the second transistor T2 and having a resistance varied according to the second slew rate control signal SCS2 obtained from the storage unit 440.

The gate high voltage VGH has a value corresponding to a high level of the gate pulse. The gate low voltage VGL has a value corresponding to a low level of the gate pulse.

The first transistor T1 is connected between the high-voltage terminal H and the output terminal OUT and is turned-on by first voltage. The first voltage is generated by boosting a direct input voltage IN1 with a level shifter L/S and is inputted to the gate of the first transistor T1 to turn on or off the first transistor T1. The first transistor T1 may be a p-type transistor.

The second transistor T2 is connected between the low-voltage terminal L and the output terminal OUT and is turned on by the second voltage. The second voltage is generated by boosting a direct input voltage IN2 with a level shifter L/S and is inputted to the gate of the second transistor T2 to turn on or off the second transistor T2. The second transistor T2 may be an n-type transistor. More precisely, the first transistor T1 and the second transistor T2 may be of a type that is different from each other.

The first variable resistor VR1 is connected between the high-voltage terminal H and the first transistor T1 and has a resistance varied according to the first slew rate control signal SCS1 transmitted from the storage unit 440.

The second variable resistor VR2 is connected between the low-voltage terminal L and the second transistor T2 and has a resistance varied according to the second slew rate control signal SCS2 transmitted from the storage unit 440.

Finally, the first clock CLK1 and the second clock CLK2 are outputted through the output terminal OUT and supplied to the delaying unit 431b.

The principle of changing the slew rate of the clock by the generator 431a will be explained below.

For example, in an RC circuit, the time constant is equal to R multiplied by C and the resistance R is proportional to the time constant. When the resistance increases, rising time of an input voltage is lengthened. Accordingly, a slew rate of the clock can be varied by changing the resistance.

As a result, in the present disclosure, the resistances of the variable resistors are varied according to the slew rate control signals SCS1 and SCS2 to change the slew rate of the clocks CLK1 and CLK2.

The gap between the clocks is controlled in the delaying unit 431b. Accordingly, the gate clocks outputted from the delaying unit 431b have a slew rate set by the generator 431a.

Fourth, referring to FIG. 8, the gate driver 200 includes stages, such as 1-stage to g-stage. The gate driver 200 sequentially outputs gate pulses GP1 to GPg to the gate lines GL1 to GLg.

Each of the stages 210 is connected to the gate line. The stage 210 generates the gate pulse GP using the gate clocks GCLK1 and GCLK2 transmitted from the gate clock generating unit 431, and outputs the generated gate pulse to the gate line.

A liquid crystal display device according to some embodiments of the present disclosure may include a liquid crystal display panel including gate lines, data lines, first touch electrodes parallel to the gate lines, and second touch electrodes perpendicular to the gate lines, a touch sensing unit configured to supply a common voltage to the first touch electrodes and the second touch electrodes during an image display period and configured to sense a touch contact or operation via the first touch electrodes and the second touch electrodes during a touch sensing period, a controller configured to generate at least two gate clocks having a specific slew rate, a gate driver configured to generate gate pulses with the gate clocks and configured to sequentially output the gate pulses to the gate lines during the image display period; and a data driver configured to supply data voltages to the data lines in response to a data control signal transmitted from the controller during the image display period.

A gap between the gate clocks may be any one among a plurality of gaps between the gate clocks included within a range in which an area of the second touch electrode is brighter than an area of the first touch electrode in a graph representing a difference in brightness between the area of the second touch electrodes and the area of the first touch electrodes based on the gaps between the gate clocks.

In one or more embodiments, the controller includes a storage unit configured to store at least two slew rate control signals and a gate clock generating unit configured to generate the gate clocks by using at least two variable resistors in response to the slew rate control signals, whereby the gate clocks have a specific gap.

In one or more embodiments, the gate clock generating unit includes at least two generators that generate clocks by changing a resistance of at least two variable resistors using the slew rate control signals and a delay unit configured to generate the gate clocks having the specific gap by delaying the clocks using a gap control signal obtained from the storage unit.

In one or more embodiments, each of the generators includes a first transistor connected between a high-voltage terminal supplied with a gate high voltage and an output terminal outputting the clock and that is turned on by a first voltage, a second transistor connected between a low-voltage terminal supplied with a gate low voltage and the output terminal and that is turned on by a second voltage, a first variable resistor connected between the high-voltage terminal and the first transistor and having a resistance varied according to the first slew rate control signal obtained from the storage unit and a second variable resistor connected between the low-voltage terminal and the second transistor and having a resistance varied according to the second slew rate control signal obtained from the storage unit.

In one or more embodiments, the liquid crystal display device further comprises: an array of pixels; wherein the plurality of gate lines are connected to said pixels and configured to transfer, during the image display period, the gate pulses generated from the at least two gate clocks, the gate clocks comprising a first gate clock signal and a second gate clock signal that have a gap value and a slew rate value; and wherein the plurality of data lines are connected to said pixels and configured to transfer, during the image display period, the data voltages needed for displaying images via said pixels, whereby said gap value and said slew rate value are based upon an adjustment resulting in a Vertical Stripe Figure Of Merit (VSFOM) value that is as close to zero as possible.

In one or more embodiments, said gap value is defined as the time difference between a falling edge of a particular gate pulse in the first gate clock signal to a rising edge of a corresponding gate pulse in the second gate clock signal.

In one or more embodiments, the adjustment is achieved by setting said slew rate value upon maximally widening said gap value.

In one or more embodiments, the liquid crystal display device is configured as an in-cell type touch display device.

According to some embodiments of the present disclosure, a display panel can include an array of pixels, a plurality of gate lines connected to the pixels and configured to transfer, during an image display period, gate pulses generated from at least a two gate clock signals comprising a first gate clock signal and a second gate clock signal that have a gap value and a slew rate value and a plurality of data lines connected to the pixels and configured to transfer, during the image display period, data voltages needed for displaying images via the pixels, whereby the gap value and the slew rate value are based upon an adjustment resulting in a Vertical Stripe Figure Of Merit (VSFOM) value that is as close to zero as possible.

In one or more embodiments, said gap value is defined as the time difference between a falling edge of a particular gate pulse in the first gate clock signal to a rising edge of a corresponding gate pulse in the second gate clock signal.

In one or more embodiments, said the adjustment is achieved by setting the slew rate value upon maximally widening the gap value.

In one or more embodiments, said the pixels, the gate lines, and the data lines are part of an in-cell type touch display device.

According to the embodiments of the present disclosure, striped patterns do not appear on the display screen along the touch electrodes that are arranged perpendicular to the gate lines.

Those skilled in the art can understand that the present disclosure can be implemented in other specific embodiments without departing from the technical concept or features of the present disclosure. Accordingly, it should be understood that the above-mentioned embodiments are exemplary but not definitive in all aspects. The scope of the present disclosure is described by the appended claims, and it should be understood that all changes and modifications derived from the meaning, scope, and equivalent concept of the claims belong to the scope of the present disclosure.

What is claimed is:

1. A liquid crystal display device comprising:
    a liquid crystal display panel including gate lines, data lines, first touch electrodes parallel to the gate lines, and second touch electrodes perpendicular to the gate lines;
    a touch sensing unit configured to supply a common voltage to the first touch electrodes and the second touch electrodes during an image display period, and configured to sense a touch contact or operation via the first touch electrodes and the second touch electrodes during a touch sensing period;
    a controller configured to generate at least two gate clocks;
    a gate driver configured to generate gate pulses with the gate clocks, and configured to sequentially output the gate pulses to the gate lines during the image display period; and
    a data driver configured to supply data voltages to the data lines in response to a data control signal transmitted from the controller during the image display period,
    wherein a gap between the gate clocks is any one among a plurality of gaps between the gate clocks included within a range in which an area of the second touch electrode is brighter than an area of the first touch electrode in a graph representing a difference in brightness between the area of the second touch electrodes and the area of the first touch electrodes based on the gaps between the gate clock.

2. The liquid crystal display device according to claim 1, wherein the controller includes:
    a storage unit configured to store at least two slew rate control signals; and
    a gate clock generating unit configured to generate the gate clocks by using at least two variable resistors in response to the slew rate control signals,
    whereby the gate clocks have the gap.

3. The liquid crystal display device according to claim 2, wherein the gate clock generating unit includes:
- at least two generators that generate clocks by changing a resistance of at least two variable resistors using the slew rate control signals; and
- a delay unit configured to generate the gate clocks having the gap by delaying the clocks using a gap control signal obtained from the storage unit.

4. The liquid crystal display device according to claim 3, wherein each of the generators includes:
- a first transistor connected between a high-voltage terminal supplied with a gate high voltage and an output terminal outputting the clock and that is turned on by a first voltage;
- a second transistor connected between a low-voltage terminal supplied with a gate low voltage and the output terminal and that is turned on by a second voltage;
- a first variable resistor connected between the high-voltage terminal and the first transistor and having a resistance varied according to a first slew rate control signal obtained from the storage unit; and
- a second variable resistor connected between the low-voltage terminal and the second transistor and having a resistance varied according to a second slew rate control signal obtained from the storage unit.

5. A display panel comprising:
an array of pixels;
- a plurality of gate lines connected to the pixels and configured to transfer, during an image display period, gate pulses generated from at least gate clock signals comprising a first gate clock signal and a second gate clock signal that have a gap value and a slew rate value; and
- a plurality of data lines connected to the pixels and configured to transfer, during the image display period, data voltages needed for displaying images via the pixels,
- whereby the gap value and the slew rate value are based upon an adjustment resulting in a Vertical Stripe Figure Of Merit (VSFOM) value that is as close to zero as possible, and
- wherein the gap value between the gate clock signals is any one among a plurality of gap values between the gate clock signals included within a range in which an area of second touch electrodes perpendicular to the gate lines is brighter than an area of first touch electrodes parallel to the gate lines in a graph representing a difference in brightness between the area of the second touch electrodes and the area of the first touch electrodes based on the gap values between the gate clock signals.

6. The display panel of claim 5, wherein the gap value is defined as the time difference between a falling edge of a particular gate pulse in the first gate clock signal to a rising edge of a corresponding gate pulse in the second gate clock signal.

7. The display panel of claim 6, wherein the adjustment is achieved by setting the slew rate value upon maximally widening the gap value.

8. The display panel of claim 7, wherein the pixels, the gate lines, and the data lines are part of an in-cell type touch display device.

9. A controller implemented in a display device, the controller comprising:
- a storage unit configured to store a first slew rate control signal and a second slew rate control signal;
- a first generator configured to generate a first clock by changing a resistance of at least two variable resistors using the first and second slew rate control signals;
- a second generator configured to generate a second clock by changing a resistance of at least two variable resistors using the first and second slew rate control signals; and
- a delay unit configured to generate a first gate clock and a second gate clock having a gap value by delaying the first and second clocks using a gap control signal obtained from the storage unit.

10. The controller of claim 9, wherein each of the first and second generators includes:
- a first transistor connected between a high-voltage terminal supplied with a gate high voltage and an output terminal outputting the clock and that is turned on by a first voltage;
- a second transistor connected between a low-voltage terminal supplied with a gate low voltage and the output terminal and that is turned on by a second voltage;
- a first variable resistor connected between the high-voltage terminal and the first transistor and having a resistance varied according to the first slew rate control signal obtained from the storage unit; and
- a second variable resistor connected between the low-voltage terminal and the second transistor and having a resistance varied according to the second slew rate control signal obtained from the storage unit.

11. The controller of claim 10, wherein the first slew rate control signal is a signal for changing a resistance of the first variable resistor of the first generator, and the second slew rate control signal is a signal for changing a resistance of the second variable resistor of the second generator.

12. The controller of claim 10, wherein the resistance of the first generator varied according to the first and second slew rate control signals changes a slew rate of the first clock, and the resistance of the second generator varied according to the first and second slew rate control signals changes a slew rate of the second clock.

13. The controller of claim 9, wherein the gap value is a time difference between a falling edge of a particular gate pulse in the first gate clock signal to a rising edge of a corresponding gate pulse in the second gate clock signal.

* * * * *